United States Patent
Chang

(10) Patent No.: US 6,573,477 B1
(45) Date of Patent: Jun. 3, 2003

(54) SAFETY ELECTRIC SEALER HAVING A SAFETY GATE

(75) Inventor: Richard Chang, Taipei Hsien (TW)

(73) Assignee: Welcome Company Ltd., Taipei Hsien (TW)

( * ) Notice: Subject to any disclaimer, the term of this patent is extended or adjusted under 35 U.S.C. 154(b) by 0 days.

(21) Appl. No.: 10/142,906

(22) Filed: May 13, 2002

(51) Int. Cl.⁷ .................................................. H05B 3/02
(52) U.S. Cl. .................... 219/243; 219/227; 219/228; 219/524
(58) Field of Search ............................... 219/243, 227, 219/228, 229, 233, 201, 240, 241, 524; 156/579, 515, 583.1, 583.2, 583.4, 583.8, 583.9, 379.6, 499

(56) References Cited

U.S. PATENT DOCUMENTS

| | | | | |
|---|---|---|---|---|
| 3,867,226 A | * | 2/1975 | Guido et al. ................ | 156/579 |
| 5,142,123 A | * | 8/1992 | Chou .......................... | 219/243 |
| 5,854,466 A | * | 12/1998 | Chou .......................... | 219/227 |
| 6,040,559 A | * | 3/2000 | Chou .......................... | 219/229 |
| 6,064,038 A | * | 5/2000 | Chou et al. .................. | 219/233 |
| 6,232,579 B1 | * | 5/2001 | Chou et al. .................. | 219/243 |
| 6,246,027 B1 | * | 6/2001 | Griffiths ..................... | 219/524 |
| 6,326,594 B1 | * | 12/2001 | Chang et al. ............... | 219/243 |
| 6,335,515 B1 | * | 1/2002 | Chou et al. .................. | 219/243 |

* cited by examiner

Primary Examiner—Teresa Walberg
Assistant Examiner—Fadi H. Dahbour
(74) Attorney, Agent, or Firm—Bacon & Thomas, PLLC

(57) ABSTRACT

A safety electric sealer is disclosed for sealing polybags and the like, which includes a first arm body, an electric heating mechanism, a second arm body, and a safety gate. The electric heating mechanism is mounted in a receiving chamber within the first arm body. The safety gate is adapted for closing/opening the receiving chamber of the first arm body, keeping the electric heating mechanism blocked when the safety electric sealer not in action.

8 Claims, 4 Drawing Sheets

SAFETY ELECTRIC SEALER HAVING A SAFETY GATE

BACKGROUND OF THE INVENTION

1. Field of the Invention

The present invention relates to an electric sealer and, more particularly, to a safety electric sealer, which has a safety gate that prevents touching of the heating mechanism accidentally.

2. Description of Related Art

A variety of electric sealers have been disclosed, and have appeared on the market. U.S. Pat. No. 5,142,123, entitled "ELECTRIC SEALER ENERGIZABLE BY INTERNAL BATTERY SET OR EXTERNAL AC ADAPTER shows an exemplar adapted for sealing polybags and the like. Conventional electric sealers are functional, however they tend to be triggered accidentally.

SUMMARY OF THE INVENTION

It is the main object of the present invention to provide a safety electric sealer, which has provides a safety gate that prevents touching of the heating mechanism accidentally. It is another object of the present invention to provide a safety electric sealer, which has a safety switch that prevents triggering of the heating mechanism accidentally.

To achieve these and other objects of the present invention, the safety electric sealer comprises a first arm body, an electric heating mechanism, a second arm body, and a safety gate. The first arm body has a receiving chamber. The electric heating mechanism is mounted in the receiving chamber of the first arm body, comprising a heating unit, and a control switch adapted for controlling on/off status of the heating unit and preventing triggering of the heating unit accidentally. The second arm body is pivoted to the first arm body. The safety gate is installed in the first arm body and adapted for closing/opening the receiving chamber. When the electric sealer not in action, the safety gate closes the receiving chamber of the first arm body, keeping the electric heating mechanism from touching accidentally. Further, safety lock means may be provided to prevent triggering of the electric heating mechanism accidentally.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
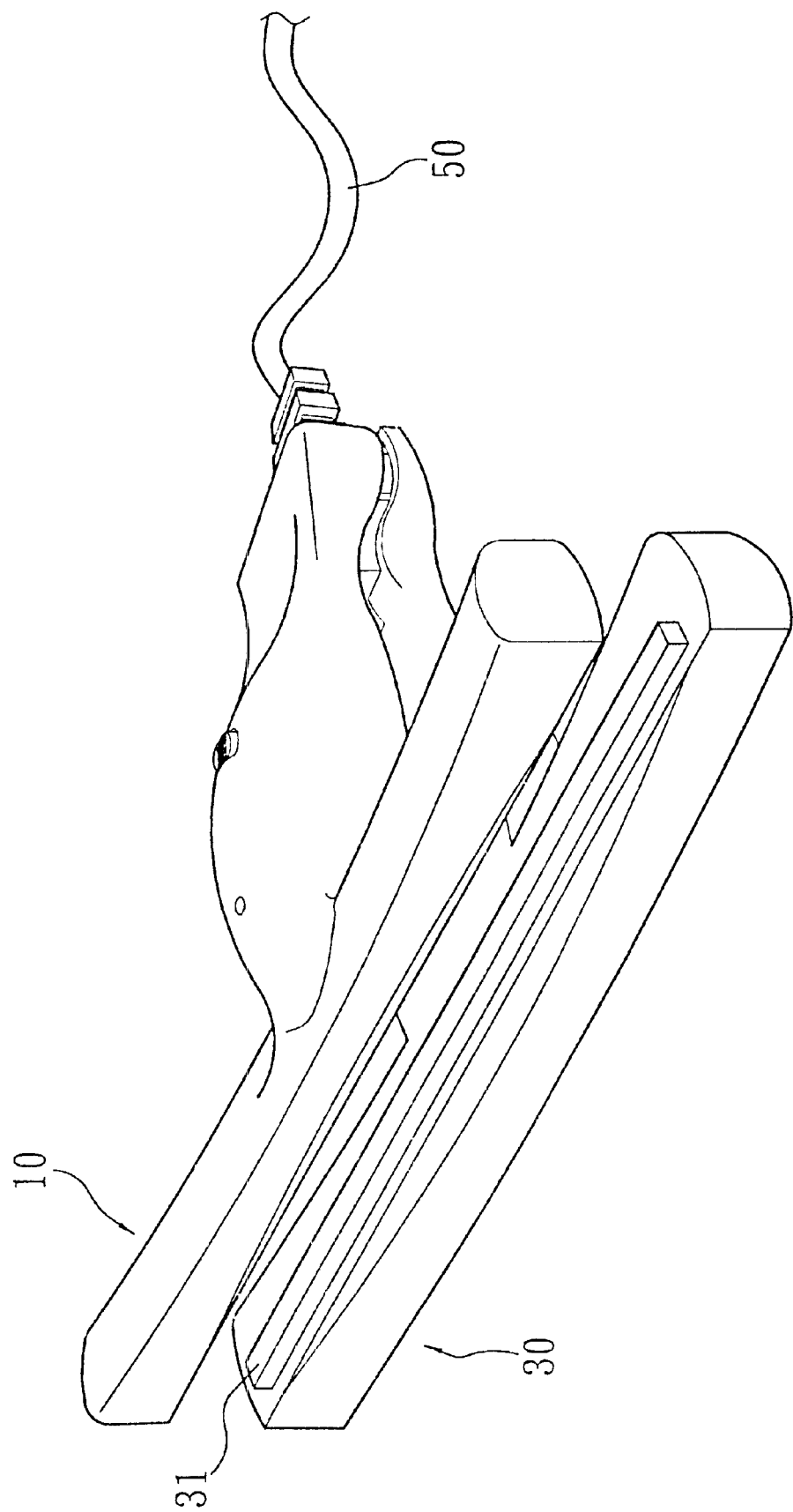
FIG. 1 is an elevational view of a safety electric sealer according to the present invention.
Figure 2:
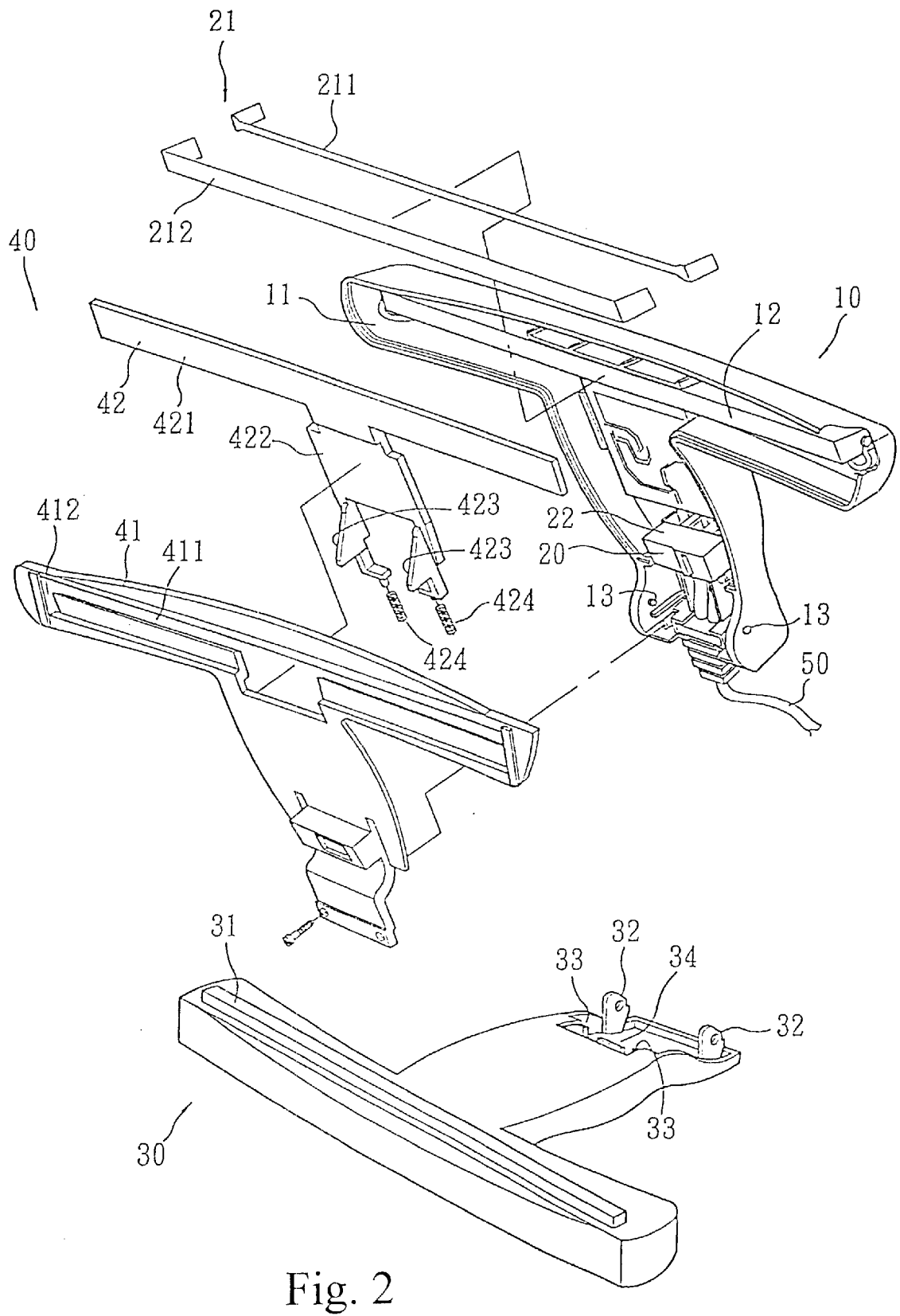
FIG. 2 is an exploded view of the safety electric sealer according to the present invention.

With reference to FIG. 1, a first arm body 10, an electric heating mechanism 20, a second arm body 30, and a safety gate 40.

The first arm body 10 comprises a substantially T-shaped receiving chamber 11, and a heat insulation block 12 fixedly mounted within the receiving chamber 11. The heat insulation block 12 can be made of ceramics, bakelite, heat insulation plastics, or any of a variety of materials that resists heat over 200° C.

The electric heating mechanism 20 is mounted in the receiving chamber 11 of the first arm body 10, comprising a heating unit 21 and a control switch 22. The heating unit 21 comprises an electric heating element 211 fixedly mounted on the heat insulation block 12, a heat resisting covering 212 covered on the electric heating element 211. The heat resisting covering 212 is made of Teflon. Teflon is heat resisting, and prevents adhering of molten plastics. Therefore, the heat resisting covering 212 well protects the electric heating element 211. The control switch 22 has an external power cord 50 connected thereto and, is electrically connected to the electric heating element 211. The control switch 22 is a press-button switch. Because the action and principle of the control switch 22 are well know to the people skilled in the art, no further detailed description in this regard is necessary.

The second arm body 30 is a substantially T-shaped member matching the first arm body 10, comprising a pair of pivot holes 32 respectively pivoted to a pair of pivot rods 13 of the first arm body 10, and a protruded portion 31 corresponding to the heating unit 21 of the electric heating mechanism 20.

The safety gate 40 comprises a cover plate 41 and a shutter plate 42. The cover plate 41 is fixedly fastened to the first arm body 10 to close the receiving chamber 11, having an opening 411 corresponding to the heating unit 21, and a track 412. The shutter plate 42 is adapted for closing/opening the opening 411, comprising a face panel 421, an extension plate 422, a pair of bevel guide plates 423, and a pair of return springs 424. The face panel 421 of the shutter plate 42 is movably positioned in the track 412 of the cover plate 41.

Figure 3:
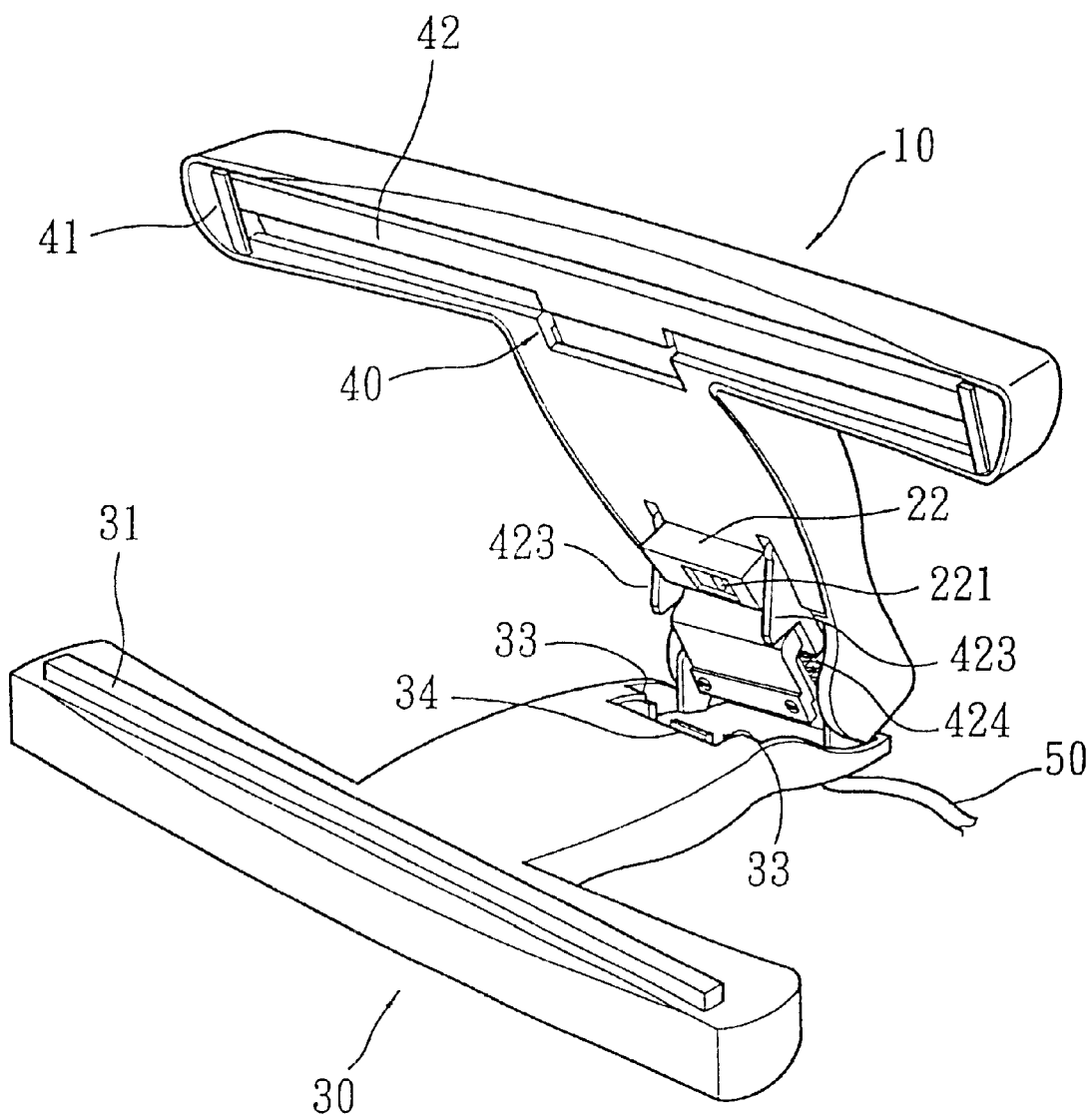
FIG. 3 is an assembly view of the safety electric sealer according to the present invention.

Referring to FIG. 3, the second arm body 30 comprises two baffles 33 corresponding to the bevel guide plates 423, and a pressure plate 34 corresponding to the button 221 of the control switch 22.

Figure 4:
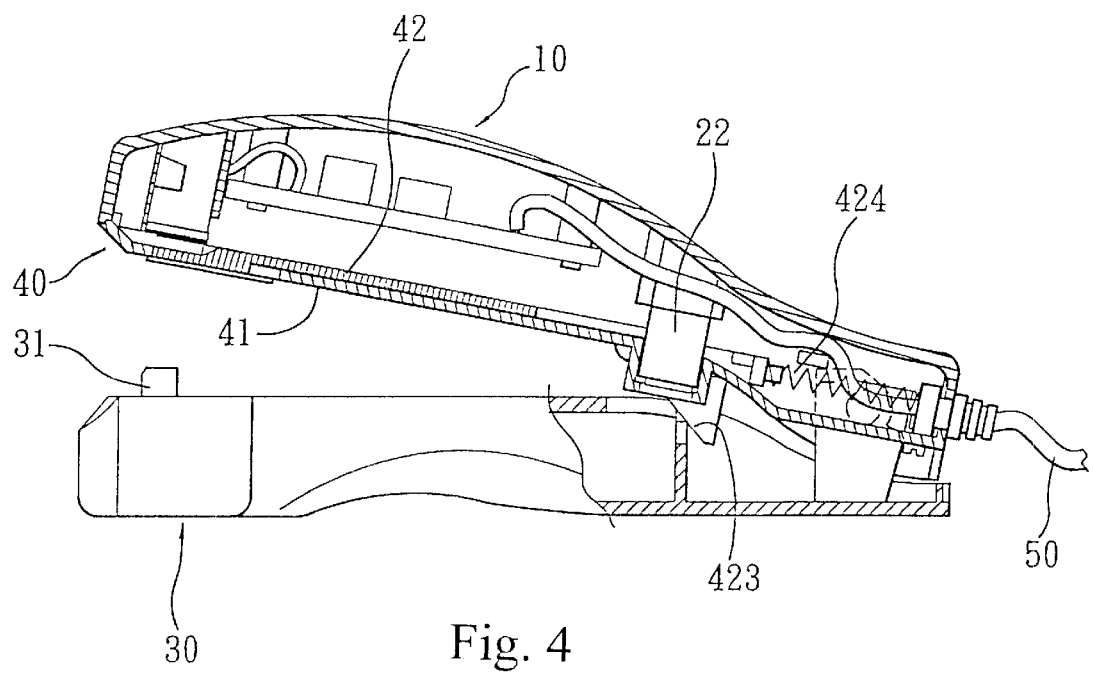
FIG. 4 is a side view in section of the present invention showing the safety gate of the safety electric sealer closed.

Referring to FIG. 4 and FIG. 3 again, when not in use, the return springs 424 force the shutter plate 42 forwards, causing the face panel 421 of the shutter plate 42 to close the opening 411 of the cover plate 41, and therefore the electric heating mechanism 20 is blocked from touching. When in use, the first arm body 10 is turned toward the second arm body 30, causing the bevel guide plates 423 of-the shutter plate 42 to touch the baffles 33 of the second arm body 30 respectively. When continuously employing pressure to the first arm body 10 toward the second arm body 30, the bevel guide plates 423 are forced to move the shutter plate 42 backwards, thereby causing the face panel 421 of the shutter plate 42 to be opened from the opening 411 of the cover plate 41.

Figure 5:
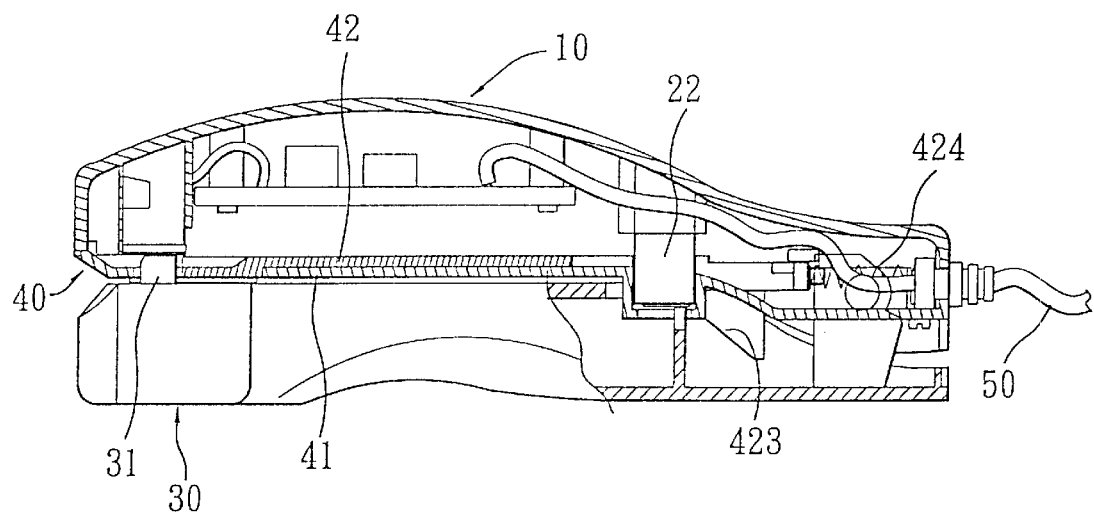
FIG. 5 is a side view in section of the present invention showing the safety gate of the safety electric sealer opened.

Referring to FIG. 5, when the opening 411 opened, the protruded portion 31 of the second arm body 30 is inserted into the opening 411 and pressed on the heating unit 21 of the electric heating mechanism 20. When the first arm body 10 and the second arm body 30 pressed against each other heavily at this time, the pressure plate 34 of the second arm body 30 imparts a pressure to the button 211 of the control switch 22, thereby causing the heating unit 21 of the electric heating mechanism 20 to start heating and to further seal the polybag. When the external pressure disappeared after sealing, the spring power of the return springs 424 moves the shutter plate 42 forwards, thereby causing the face panel 421 of the shutter plate 42 to close the opening 411 again, and therefore the electric heating mechanism 20 is blocked again.

As indicated above, the safety gate of the safety electric sealer prevents touching of the electric heating mechanism accidentally. Further, the pres-button switch prevents triggering of the electric heating mechanism accidentally. Further, the present invention is practical in use because the safety gate and the safety press-button switch of the present invention are automatically operable.

A prototype of safety electric sealer has been constructed with the features of FIGS. 1~5. The safety electric sealer functions smoothly to provide all of the features discussed earlier.

Although a particular embodiment of the invention has been described in detail for purposes of illustration, various modifications and enhancements may be made without departing from the scope of the invention. Accordingly, the invention is not to be limited except as by the appended claims.

What is claimed is:

1. A safety electric sealer comprising:

a first arm body, said first arm body comprising a receiving chamber;

an electric heating mechanism mounted in the receiving chamber of said first arm body;

a second arm body pivoted to said first arm body; and a safety gate installed in said first arm body and adapted for closing/opening said receiving chamber.

2. The safety electric sealer as claimed in claim 1, wherein said electric heating mechanism comprises a heating unit and a control switch adapted for controlling the operation of said heating unit.

3. The safety electric sealer as claimed in claim 2, wherein said heating unit comprises an electric heating element, and a heat resisting covering covered on said electric heating element.

4. The safety electric sealer as claimed in claim 2, wherein said safety gate comprises a cover plate, said cover plate having an opening corresponding to said heating unit of said electric heating mechanism, and a shutter plate adapted for closing/opening the opening of said cover plate.

5. The safety electric sealer as claimed in claim 4, wherein said cover plate comprises a track; said shutter plate comprises a face panel movable with said shutter plate along said track to close/open said opening of said cover plate, an extension plate extended from said face panel, a pair of bevel guide plates protruded from said extension plate, and a pair of return springs connected to said bevel guide plates and adapted for supporting said face panel in closing said opening of said cover plate.

6. The safety electric sealer as claimed in claim 5, wherein said second arm body comprises two baffles corresponding to the bevel guide plates of said shutter plate.

7. The safety electric sealer as claimed in claim 4, wherein said second arm body comprises a protruded portion facing said heating unit of said electric heating mechanism.

8. The safety electric sealer as claimed in claim 2, wherein said second arm body comprises a pressure plate corresponding to said control switch.

* * * * *